United States Patent [19]

Magee et al.

[11] Patent Number: 6,002,687
[45] Date of Patent: Dec. 14, 1999

[54] MPEG TRANSPORT STREAM REMULTIPLEXER

[75] Inventors: Mark Magee, Campbell; Brian Johnson, San Francisco; Tom Lookabaugh, Sunnyvale; Nolan Daines, Fremont, all of Calif.

[73] Assignee: Divicon, Inc., Milpitas, Calif.

[21] Appl. No.: 09/189,570

[22] Filed: Nov. 10, 1998

Related U.S. Application Data

[63] Continuation of application No. 08/581,916, Jan. 2, 1996, Pat. No. 5,835,493.

[51] Int. Cl.$^6$ ........................................................ H04J 3/24
[52] U.S. Cl. ........................... 370/394; 370/395; 370/474; 370/503; 348/467
[58] Field of Search .................................... 370/244, 252, 370/394, 395, 468, 474, 503, 517; 348/423, 465, 467

[56] References Cited

PUBLICATIONS

"Information Technology—Generic Coding of Moving Pictures and Associated Audio: Systems Recommendation H.222.0, ISO/IEC 13818–1, International Standard", National Organization for Standarization, ISO/IEC JTC1/SC29/WG11, NO801, Nov. 13, 1994.
"Information Technology—Generic Coding of Moving Pictures and Associated Audio: Video Recommendation ITU–T H.262, ISO/IEC 13818–2, International Standard", National Organization for Standarization, ISO/IEC JTC1/SC29/WG11, NO802, Jan. 20, 1995.
"Information Technology—Generic Coding of Moving Pictures and Associated Audio: Audio ISO/IEC 13818–3, Draft International Standard", National Organization for Standarization, ISO/IEC JTC1/SC29/WG11, NO703, May 10, 1994.
Information Technology—Coding of Moving Pictures and Associated Audio for Digital Storage Media at up to about 1,5 Mbit/s ISO/IEC 11172–3, 1193.
Didier LeGall, "MPEG: A Video Compresssion Standard for Multimedia Applications", Communications of the ACM, Apr. 1991, vol. 34, No. 4.
Anthony J. Wasilewski, "MPEG–2 systems specification: Blueprint for network interoperability", Communications Technology, Feb. 1994.

*Primary Examiner*—Douglas W. Olms
*Assistant Examiner*—Shick Hom
*Attorney, Agent, or Firm*—Proskauer Rose LLP

[57] ABSTRACT

A remultiplexer is disclosed for communicating plural programs. Each program comprises one or more elementary streams that are encoded in relation to a single common time base corresponding to the respective program. The communicated programs originate from plural input transport streams that each comprises plural transport packets. Each transport packet contains a packet identifier indicating the data contained therein. Within each transport stream, unique packet identifiers are assigned to each elementary stream of each program. The data of each elementary stream is only contained in transport packets having a corresponding packet identifier. Each input transport stream contains time stamps for reconstructing the single program time base corresponding to each program conveyed therein. The remultiplexer has a data link module which receives the plural input transport streams. The data link module also selectively extracts transport packets from the received input transport streams. The remultiplexer has a downstream bus on which the data link module sequentially transfers at least some of the extracted transport packets. The remultiplexer selects which of the extracted transport packets to transfer on the downstream message bus depending on the packet identifiers of the transport packets. The remultiplexer also has a scheduler which assembles the transport packets transferred on the downstream bus into a single output transport stream.

5 Claims, 9 Drawing Sheets

MPEG TRANSPORT STREAM REMULTIPLEXER

RELATED APPLICATION

This application is a Continuation of application No. 08/581,916 filed Jan 2, 1996 now U.S. Pat. No. 5,835,493 to Mark Magee, et al. which issued on Nov. 10, 1998.

Further, U.S. patent application Ser. No. 08/581,916, entitled "MPEG Transport Stream Demultiplexer," was filed on Jan. 2, 1996, now U.S. Pat. No. 5,835,493, for Mark Magee, et al. The above-noted application is commonly assignee to the same assignee as the this application and contains information that is related to the information of this application. The above-noted application is incorporated herein by reference.

FIELD OF THE INVENTION

The present invention relates to communicating stream oriented data, e.g., compressed video, compressed audio and associated data. The communicated stream is a hierarchically layered bitstream that is organized into packets. The present invention particularly relates to remultiplexing one or more higher layered streams into a single stream, i.e., selectively dropping or combining packets of the higher layered streams and adjusting information carried in the resultant remultiplexed stream to reflect those lowered layered streams contained therein.

BACKGROUND OF THE INVENTION

The present invention relates to transport and storage of compressed video and audio streams. Illustratively, the invention is illustrated herein using the International Standards Organization (ISO) Motion Picture Experts Group (MPEG) 2 standard for compressing video and related audio, conveying the compressed video and related audio to a decoder and presenting the video and related audio together. See ISO/IEC IS 13818-2: Information Technology-Generic Coding of Moving Pictures and Associated Audio Information: Video; ISO/IEC DIS 13818-1: Information Technology-Generic Coding of Moving Pictures and Associated Audio Information: Systems. For compressed audio there are numerous standards including ISO/IEC IS 11172-2: 1993 Information Technology-Coding of Moving Pictures and Associated Audio for Digital Storage Media at up to about 1.5Mbit/sec-Part 3 Audio (MPEG-1 Audio); Dolby AC-3; ISO\IEC DIS 13818-3: 1994 Information Technology-Coding of Moving Pictures and Associated Audio Information: Audio (MPEG-2 Audio). Each program is presumed to include multiple related component elementary streams such as a video elementary stream, one or more audio elementary streams, one or more private data elementary streams, etc. Illustratively, MPEG-1 and MPEG-2 provide for hierarchically organized streams. That is, for a given program, audio and video elementary streams are separately encoded to produced compressed audio and video streams. A good tutorial for MPEG-2 video compression is contained in D. Le Gall, MPEG: *A Video Compression Standard for Multimedia Applications,* COMMUNICATIONS OF THE ACM, April 1991. These compressed audio and video elementary streams are illustratively placed in a higher layer stream such as an MPEG-2 compliant transport stream. A good tutorial of MPEG-2 transport streams is contained in A. Wasilewski, MPEG-2 *Systems Specification: Blueprint for Network Interoperability,* COMM. TECH., Feb., 1994. The higher layer transport stream provides a manner for associating all related encoded video, audio and private data streams of each program carried therein so that the elementary streams of any given program can be extracted, decoded and presented together in a coherent fashion. The higher layer transport stream may include compressed audio, video and private data for only a single program or for multiple programs.

According to the MPEG-2 standard, the data of each digital elementary stream is first placed into program elementary stream (PES) packets of arbitrary length. The PES packet data, and other data, relating to one or more programs may be combined into one or more transport streams. The transport stream is organized into fixed length (more precisely, 188 byte length) packets. Each of the transport stream packets includes a four byte header and a 184 byte payload. The transport packet header includes a synchronization value, for use in identifying the boundaries (i.e., beginning) of each transport packet, followed by a packet identifier or PID. The purpose of the PID is to label the transport packet. All packets with a particular PID have related contents, e.g., all have PES packet data for a particular elementary stream, etc.

Each transport packet can carry PES packet data, e.g., private data, video data or audio data (e.g., which may be compressed and formed into streams according to MPEG-2 syntax), or program specific information (PSI) data (described below). Transport packets may not contain both PES packet data and PSI data. Furthermore, transport packets may only contain PES packet data for a single elementary stream.

PES bearing packets may also contain program clock reference (PCR) values, presentation time stamps (PTS) and decoding time stamps (DTS). Each program has a single time base established by a system time clock at the encoder in relation to which all elementary streams of the particular program are encoded. The PCR is simply a snapshot of this encoder system time clock for a particular program. Note that it is not unusual to have divergent PCR values for the elementary streams associated with different programs. PTS's indicate the time when a video picture or audio frame should be presented (i.e., displayed on a monitor or converted to sound on a loudspeaker) relative to the encoder clock (PCR's) of the encoders which produced the video and audio. On the other hand, DTS's indicate the time when a video picture should be decoded relative to the encoder clock. PTS's enable the synchronization of video and audio of a particular program despite the lack of instantaneous correlation between the video and audio bit rates. DTS's enable the timely submission of compressed anchor video pictures to the encoder for use in decoding interceded pictures which depend thereon.

PSI data includes information other than elementary stream data which is necessary to decode the PES packet data. Examples of PSI are the program association table (PAT), the program mapping table (PMT), conditional access information, and the network information table (NIT). The PAT indicates where the PMT entries (called program definitions) of each program carried by the transport stream may be found. Specifically, the PAT correlates the PID's of the transport packets carrying the program definitions with each program carried in the respective transport stream. The PMT has a program definition corresponding to each program carried in the respective transport stream. Each program definition indicates: (1) the PID of the transport packets bearing the PCR's associated with that program, (2) each ES that comprises the program, (3) the PID's of the transport packets bearing the data of each respective ES, and (4) stream specific conditional access information (discussed below). A first type of conditional access information, referred to as entitlement management messages (EMM), provides system wide oriented scrambling and access control information. A second type of conditional access information, referred to as entitlement control messages (ECM), provides elementary stream specific scrambling and access control information. The NIT contains information indicating network parameters.

FIG. 1 illustrates a prior art program encoder architecture 10 produced by Divicom, located in Milpitas, Calif. As shown, the program encoder 10 has plural plug in printed circuit card modules 11, 15, 17, 19, a main board 30, and an I-bus 20 for interconnecting the modules 11, 15, 17 and 19 to the main board 30. The I bus 20 is actually five separate busses referred to as the command bus © bus), the system clock bus (SY bus), the upstream message bus (UM bus), the downstream message bus (DM bus) and the video bus (V bus). Each module 11–19 and each circuit 31–69 is briefly described below.

Audio Encoder Module 11

The audio encoder module 11 is capable of receiving two stereo audio signals and compressing them, e.g., according to the MPEG-1 standard. The audio may be inputted in analog or digital form. The audio encoder 11 inserts the compressed audio into "quasi-transport" packets which include PTS's but which have a dummy value inserted in their PCR fields.

Video Input Module 13

This module may be a digital video input module or an analog video input module, which samples an inputted composite or component video module to produce digital video. More than one video input module 13 can be provided in the encoder 10, but only one video input module 13 may be active at a time (as selected via the processor 31). The digital video is outputted to a video preprocessor module 15 via the video bus (V bus).

Video Preprocessor Module 17

The video preprocessor module 17 performs different kinds of analysis and modification of the inputted digital video such as sample rate conversion. The modified video is outputted to the video encoder module 19 via the V bus.

Video Encoder Module 19

The video encoder module 19 compresses the filtered digital video outputted by the video preprocessor module 17. The video encoder module 19 inserts the compressed video into "quasi-transport" packets which include PTS's and DTS's but which have a dummy PCR value.

HOTLinks™ Transmitters 63,67/Receivers 61,65

The encoder 10 communicates transport packets via two bidirectional serial ports M2S port 1 and M2S port 2. (These ports M2S port 1 and M2S port 2 are referred to as the output ports because the program encoder outputs its transport stream containing the encoded program via these ports.) The serial output ports transmit data according to Cypress™'s HOTLinks™ protocol under which each transport packet byte is encoded as a ten bit value and transmitted as a serial bitstream at 108 MHZ. The HOTLinks™ transmitters 63 and 67 convert each byte to an appropriate ten bit value. The HOTLinks™ receivers 61 and 65 convert each ten bit value back to the byte it represents. The ports M2S port 1 and M2S port 2 carry identical signals and identical data.

M2P Interface

The program encoder 10 has two parallel ports M2P port 1 and M2P port 2. These ports carry identical signals and data. They are provided for outputting signals to modulation equipment which modulate transport streams onto carrier frequencies.

Processor 31

Illustratively, the processor 31 is a Motorolla™ 68360™ single chip integrated circuit processor and peripheral combination. The processor 31 controls the operation of both the main board 30 and the modules 11-19. The processor 31 also performs communications via the Ethernet controller 39. In particular, the processor 31 may receive PSI via the Ethernet controller 39 for insertion into the transport stream.

Ethernet Controller 39

The encoder 10 is advantageously controlled by a remote controller computer station 70 which can control, for instance, the coding rate of the video encoder 19 and audio encoder 11. The Ethernet controller 39 receives messages and data from the remote controller computer station 70 and transfers them to the processor 31. The remote controller computer station 70 may for instance generate PSI data for insertion into the transport stream produced by the program encoder 10 and communicate such PSI data to the processor 31 via the Ethernet controller 39.

Memory 33

The memory 33 may include general purpose DRAM for use by the processor 31. The memory 33 may also include flash memory for storing the control program executed by the processor 31. In addition, the memory 33 may have non-volatile RAM with a built in real time clock for storing configuration information. Furthermore, the memory 33 may include a PROM for storing identifying assembly/configuration information, Ethernet IP address, etc.

Downstream Message Sender 35/Upstream Message Sender 37

The downstream message sender 35 receives transport packets and enqueues them into a queue thereof. Under control of the scheduler 41, the downstream message sender 35 dequeues the transport packets stored therein and transfers the dequeued packets onto the DM bus. The upstream message sender 37 is for enqueuing packets therein for later dequeuing and transfer onto the UM bus. The downstream message sender 35 is used to manage the submission of PSI bearing transport packets. In particular, the processor 31 enqueues PSI bearing transport packets into the downstream message sender 35 for transfer onto the DM bus and assembly into the outputted transport stream. Illustratively, the upstream message sender 37 is not used in the program encoder 10 and plays no role in its operation.

Upstream Message Receivers 51, 53

The upstream message receiver circuits 51 and 53 receive transport packets transferred via an upstream link (a device which receives the outputted transport stream from the program encoder 10). One upstream message receiver circuit 51 or 53 is provided for each of the two output ports M2S port 1 and M2S port 2 provided for the encoder 10. The received upstream messages are enqueued in a respective queue until such time that the processor 31 requests that they be transferred thereto.

System Time Clock 43

The encoder has a single system time clock (STC) 43 for generating a uniform time base for the program encoded by the modules 11 and 19. The STC is a 27 MHZ two part clock as per the MPEG-2 standard. The STC 43 includes an oscillator and a counter for generating the clock value. The generated clock is outputted onto the SY bus for use by the modules 11 and 19 (e.g., for generating DTS and PTS values).

PCR Inserter 45

The PCR inserter circuit 45 receives the clock count from the STC 43. Each count can be used as a PCR value in a transport packet. The PCR insertion circuit 45 inserts as PCR's the count of the STC 43 in the appropriate field of transport packets received thereat at the appropriate time.

Scheduler 41

The scheduler circuit 41 controls the transfer of packets on the DM bus. The encoder modules 11 and 19 generate quasi-transport packets containing encoded data. These packets are queued up for transfer. The scheduler 41 indicates when each encoder module 11 and 19 or the processor 31 should transfer packets according to some schedule or policy. The scheduler 41 also allocates a portion of the total bandwidth (e.g., of the channels M2S port 1 and M2S port 2) to each module 11 and 19 by virtue of the implemented schedule or policy.

Output Formatter 47

The output formatter converts the transport packet data into a format suitable for transfer to a downstream device. Illustratively, the output formatter 47 can convert the transport packets into a format suitable for modulation onto a carrier frequency or the format for output via the serial ports M2S port 1 and M2S port 2. The output formatter 47 can output the data according to both formats simultaneously. Furthermore, the output formatter 47 can output the data according to an internal clock or an external clock and has an elastic buffer for compensating between different input and output clocks.

The operation of the program encoder 10 is briefly as follows. A remote controller computer station 70 downloads control instructions to the processor 31 via the Ethernet controller 39 for encoding a program. These instructions include, among other things, control signals for selecting modules 11–19 (to be used as input sources), for controlling the encoding thereon and for allocating bandwidth. For instance, the control information may include information for controlling the structure of each group of pictures (i.e., the rate of inserting I or intracoded pictures, P or forward only predictive encoded pictures and B or bidirectionally predictive encoded pictures). In addition, the remote controller computer station downloads PSI pertinent to the program encoded by the encoder 10 for insertion into the transport stream outputted from the encoder 10. The modules 11–19 receive inputted audio and video and produce quasi-transport packets containing encoded audio or video, PTS's, and DTS's but no PCR values. (Note that the modules 11–19 receive the system clock on the SY bus for purposes of synchronization/generation of PTS's and DTS's.) Under control of the scheduler 41, the modules 11 and 19 output their quasi-transport packets onto the DM bus. In addition, the processor 31 may generate PSI bearing transport packets bearing PSI pertinent to the program encoded by the modules 11 and 19 and enqueue them in the downstream message sender 35. Under control of the scheduler 41, the downstream message sender 35 serially transfers the queued up transport packets onto the DM bus. The quasi-transport packets containing ES data and the transport packets containing PSI data are received at the PCR inserter 47 (via the scheduler 41). The PCR inserter 47 inserts STC counts (received from the STC 43) into the PCR fields of the quasi-transport packets. The output formatter 47 formats the transport packets for output via the M2P interface 67 and/or M2S port 1 and M2S port 2 via HOTLinks™ transmitters 63 and 67.

The program encoder 10 is therefore effective in producing a transport stream bearing a single program (i.e., the video ES and audio ES's of a single program).

It is desirable to multiplex the programs of multiple transport streams into a single transport stream. Such a task typically involves more than just selectively alternately transmitting transport packets of different programs in a single stream. Rather, certain data carried in transport packets of the transport streams must be adjusted to reflect the entire contents of the new transport stream formed from the transport packets that are combined together. For instance, MPEG-2 requires that packets bearing the PID 0x0000 must contain PAT data. However, each transport stream to be multiplexed contains its own PAT. Therefore, the PAT information of the individual transport streams to be multiplexed must be combined into a single PAT. (Note, if not all programs are multiplexed into the final outputted stream, the PAT should not include entries for the deleted programs.) Such a multiplexing operation, in which transport packet content is adjusted based on which programs and PSI are multiplexed together is often referred to as "remultiplexing." Remultiplexing MPEG-2 transport streams has been described in the prior art although no specific hardware architectures for performing remultiplexing operations have been disclosed.

It is an object of the present invention to provide an MPEG-2 transport stream remultiplexer. It is also an object to provide an MPEG-2 remultiplexer which has at least some interchangeable parts with the conventional MPEG-2 program encoder 10 described above.

SUMMARY OF THE INVENTION

These and other objects are achieved by the present invention. According to one embodiment, a remultiplexer is provided for communicating plural programs. Each program comprises one or more elementary streams that are encoded in relation to a single common time base corresponding to the respective program. The communicated programs originate from plural input transport streams that each comprises plural transport packets. Each transport packet contains a packet identifier indicating the data contained therein. Within each transport stream, unique packet identifiers are assigned to each elementary stream of each program. The data of each elementary stream is only contained in transport packets having a corresponding packet identifier. Each input transport stream contains time stamps for reconstructing the single program time base corresponding to each program conveyed therein. The remultiplexer has a data link module which receives the plural input transport streams. The data link module also extracts transport packets from the received input transport streams. The remultiplexer has a downstream bus on which the data link module sequentially transfers selected ones of the extracted transport packets. The remultiplexer selects which of the extracted transport packets to transfer on the downstream message bus depending on the packet identifiers of the transport packets. The remultiplexer also has a scheduler which assembles the transport packets transferred on the downstream bus into a single output transport stream.

Illustratively, the data link module is capable of capturing (storing for subsequent processing) packets with specific PIDs, dropping packets with certain PIDs, transferring packets with certain PIDs onto the downstream message bus, capturing and dropping packets with certain PIDs or capturing and transferring on the downstream message bus packets with certain PIDs. Amongst other things, the capturing of packets enables the remultiplexer and attached remote control computer to discern the contents of the transport streams. The dropping of packets enables the remultiplexer to remove unwanted PSI, programs and elementary streams in the outputted remultiplexed transport stream whereas the transferring of packets on the downstream message bus enables the remultiplexer to include desired PSI, programs and elementary streams in the outputted remultiplexed transport stream.

Illustratively, the remultiplexer is provided with a processor. Amongst other things, the is processor is capable of serially inserting substitute PSI bearing transport packets which reflect the combined contents of the outputted transport stream.

Note that the data link module receives transport stream packets in parallel but transfers them onto the downstream bus serially. This can introduce unwanted jitter into the remultiplexed transport stream. Advantageously, the data link module is provided with a PCR fixer circuit which records a time stamp of a local clock for each received transport packet bearing a PCR. When the transport packet is to be transferred onto the downstream bus, the PCR fixer determines the "dwell" time, or transport packet delay incurred within the remultiplexer, from the recorded time and the current time of the local clock. The PCR fixer circuit can adjust the PCR of the transport packet to reflect the dwell time. For instance, an average dwell time of all transport packets may be subtracted from the dwell time and the result may be added to the current PCR of the transport packet.

Note that the parts which cooperate with the data link module, namely, the scheduler, downstream message bus, and processor are all parts found on the main board of the program encoder. Therefore, the remultiplexer of the present invention may be implemented using a similar main board as the program encoder and the data link module.

The remultiplexer can be cascaded according to a number of configurations. For instance, several program encoders may be connected to a single remultiplexer. In such a configuration, the remultiplexer combines the programs of several single program transport streams into a single, multiple program transport stream. A remultiplexer can also receive, and remultiplex, the transport streams produced by other remultiplexers. Thus, the programs of multiple remultiplexed transport streams may be combined into a single remultiplexed transport stream.

According to another embodiment, the data link module provides for two-way communication of transport stream packets. Thus, downstream directed message bearing transport packets may be captured at the remultiplexer and/or propagated further downstream. Likewise, upstream directed message packets may be propagated further upstream, i.e., to the devices which input the transport streams to be remultiplexed. Such message propagation via transport packets provides a fast, low latency message passing mechanism. Such message passing may be utilized to indicate a fault in a cascaded structure of remultiplexers and program encoders, to implement redundancy of program encoders or remultiplexers, to regulate the bandwidth allocated to different programs, to synchronize two program encoders, etc.

In short, a flexible remultiplexer architecture is provided for remultiplexing one or more higher layered transport streams to selectively include one or more programs, or elementary streams of programs, carried therein. The remultiplexer provides a simple reconfigurable architecture which utilizes the PID's of inputted transport packets as a basis of extracting, capturing, discarding and replacing inputted transport packets. The remultiplexer is simple and efficient and provides for complex remultiplexing and cascaded architectures.

DETAILED DESCRIPTION OF THE INVENTION

Figure 2:
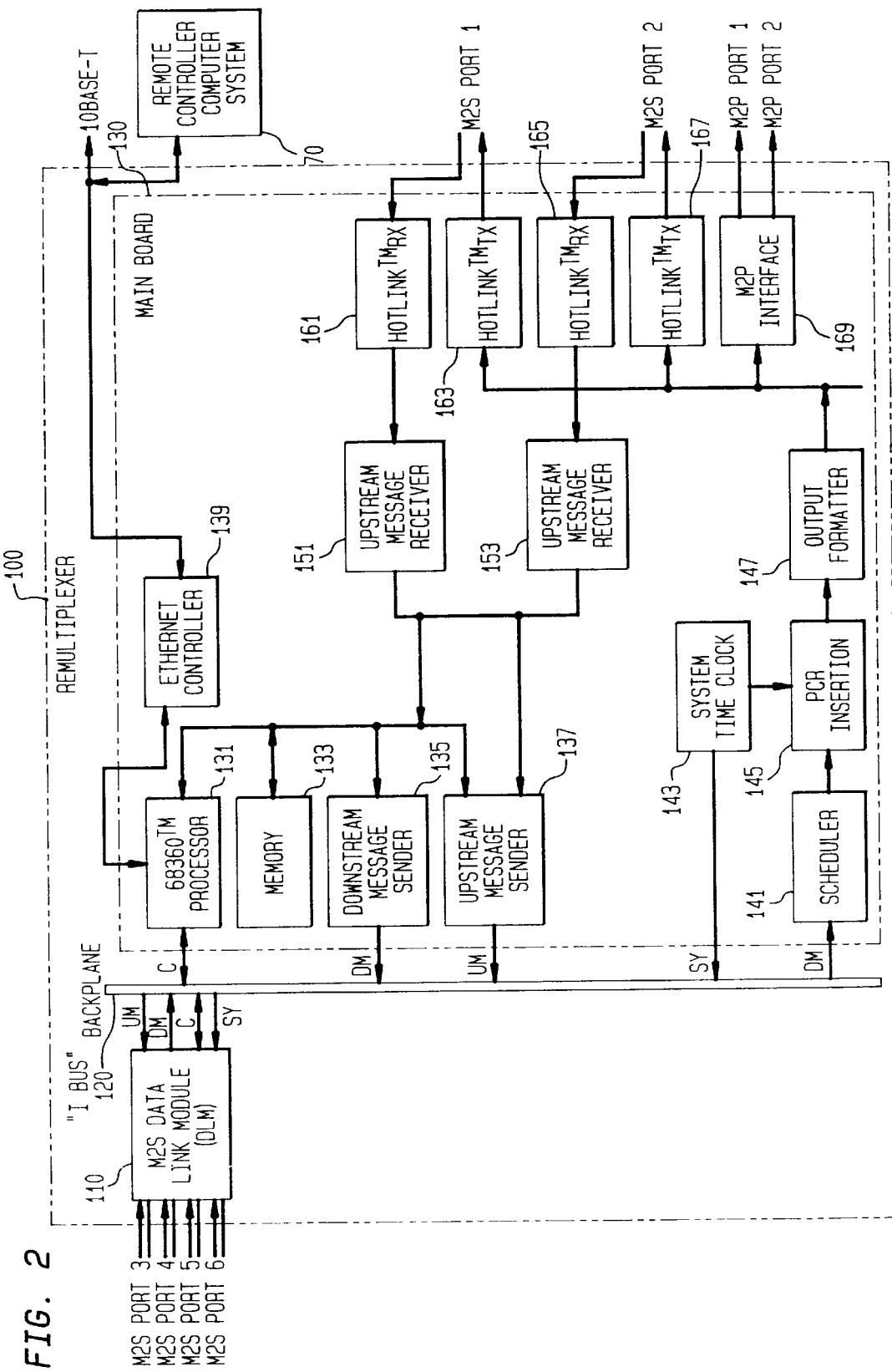
FIG. 2 shows a remultiplexer according to an embodiment of the present invention.

FIG. 2 shows a remultiplexer 100 according to an embodiment of the present invention. As shown, the remultiplexer 100 has a main board 130, an I-bus 120 and one or more data link modules (DLMs) 110. Illustratively, the remultiplexer 100 can support up to four DLMs 110.

Figure 1:
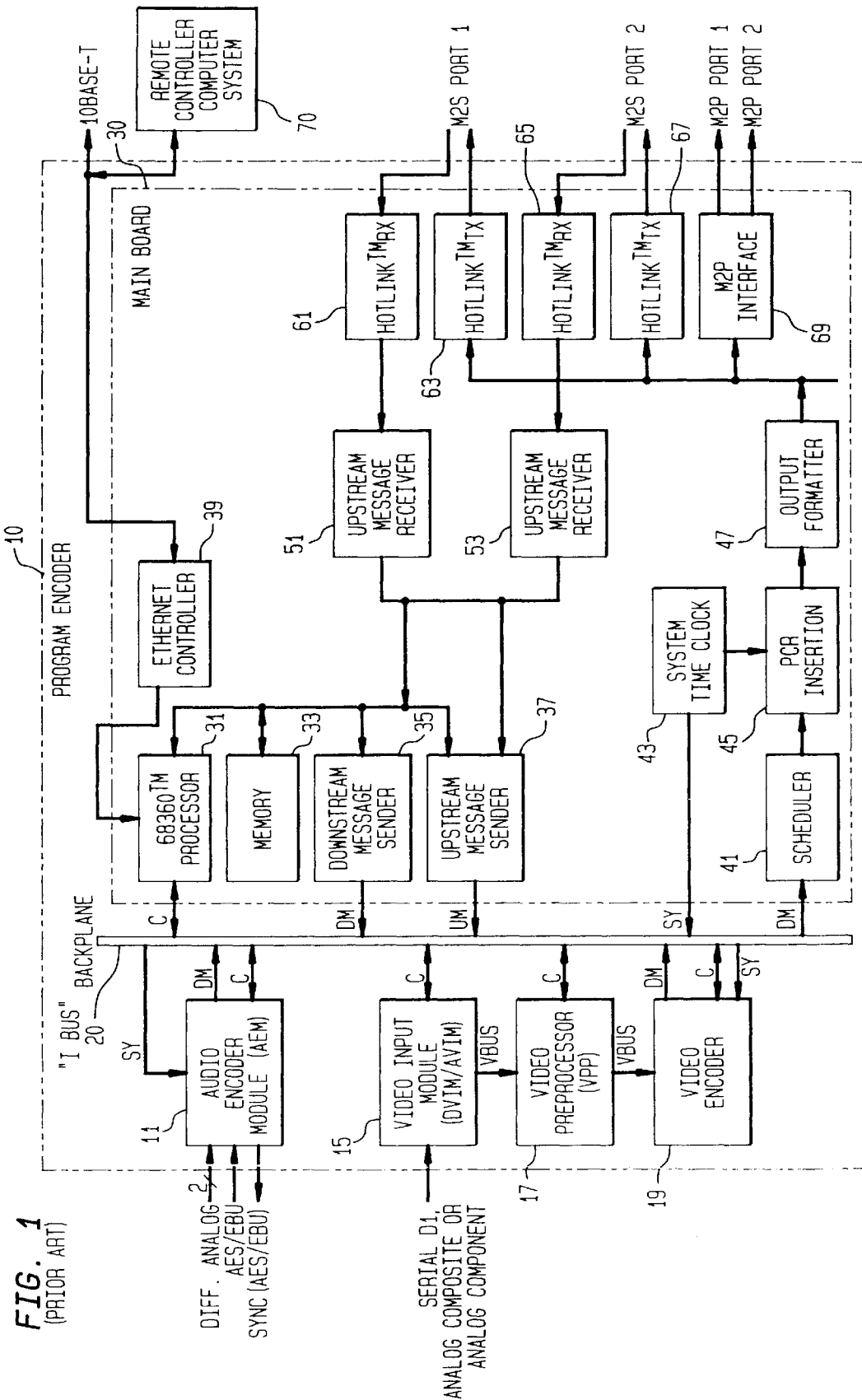
FIG. 1 shows a conventional program encoder.

The main board 130 and I-bus 120 of the remultiplexer 100 are of an identical hardware architecture as the main board 30 and I-bus 20 of the program encoder 10 of FIG. 1. Like the program encoder 10 of FIG. 1, the remultiplexer main board 130 has a processor 131, memory 133, downstream message sender 135, upstream message sender 137, Ethernet controller 139, scheduler 141, system time clock 143, PCR insertion circuit 145, output formatter 147, upstream message receivers 151, 153 HOTLinks™ transmitters 163, 167, HOTLinks™ receivers 161, 165 and parallel interface 169. The PCR inserter 145 plays no role in the remultiplexer 100. On the other hand, the upstream message sender 137, which is not used in the program encoder 10, is utilized in the remultiplexer 100. The other circuits 131, 133, 135, 139, 141, 143, 147, 151, 153, 161, 163, 165, 167, 169 perform functions that have similarities to their counterparts 31, 33, 35, 37, 39, 41, 43, 47, 51, 53, 61, 63, 65, 67 and 69 in the program encoder 10. The differences in function/operation lie in how these circuits cooperate together or respond to different received signals. Such differences operation may be achieved by virtue of changing the software provided to the processor 131 which controls the operation of the remultiplexer 100. The operation of these devices is discussed in greater detail below.

The DLM 110 has plural, e.g., four, input M2S ports labeled M2S port 3, M2S port 4, M2S port 5 and M2S port 6. Illustratively, each input can be connected to a cable which carries a serial bitstream according to Cypress™'s HOTLinks™ protocol (i.e., at 108 MHZ). Each M2S input port provides for bidirectional communication. While each port is bidirectional, they are referred to as input ports to indicate the direction of flow of the to-be-remultiplexed transport streams into the remultiplexer 100.

The DLM 110 enables the remultiplexer 100 to achieve its remultiplexing function—to selectively multiplex transport streams received from other devices via the input ports M2S port 3, M2S port 4, M2S port 5 and M2S port 6 and to alter content oriented information (namely, PSI) to reflect the resulting multiplexed transport stream. The DLM 110 also enables the remultiplexer 100 to transmit upstream directed messages to the devices which transmit the to-be-remultiplexed transport streams to the remultiplexer 100 and to receive downstream directed messages from those devices.

Basically, the DLM 110 receives, in parallel, transport packets of inputted transport streams. Depending on the PID of each transport packet, the DLM 110 extracts and transfers the transport packet onto the DM bus for assembly into the outputted remultiplexed transport stream by the scheduler 141. Furthermore, depending on the PID of each transport packet, the DLM 110 extracts and captures the transport packet for transfer on the C bus. The DLM 110 can receive from the processor 131, and store, PIDs and corresponding indications for capturing and transferring packets. Using these indications, the DLM 110 can determine whether or not to capture, transfer, both capture and transfer or neither capture nor transfer each received transport packet.

These basic operations can be used to achieve more complicated functions. For instance, consider a basic selective remultiplexing operation where each received transport stream contains one or more programs. As per the MPEG-2 standard, each program includes one or more ESs, e.g., a video ES, an audio ES, a second audio program audio ES (i.e., different language audio), a data ES (such as closed-captioned text), etc. The data of each ES is transferred in mutually exclusive transport packets. The packets which carry a given ES are assigned a PID that is unique within that individual transport stream. Suppose the PIDs of the transport packets containing desired ESs and other PSI of the received transport streams are known ahead of time. The processor 131 (or remote controller computer station 70 in conjunction with the processor 131) downloads to the DLM 110 via the C bus a transfer indication for each of the PIDs corresponding to transport packets to be remultiplexed into the outputted transport stream. For each other PID, no such indication is provided (illustratively, the default indication for each other PID is to refrain from transferring the respective packet onto the DM bus). The DLM 110 receives each transport packet of each inputted transport stream in parallel. The DLM 110 retrieves the indications corresponding to the retrieved PID to determine what action is to be performed on the transport packet based on the capture and transfer indicators. If the retrieved indicator indicates that the corresponding transport packet should be transferred via the DM bus, the DLM 110 transfers the respective transfer packets onto the DM bus. The DLM 110 refrains from transferring each other transport packet not having such an indicator onto the DM bus. The transport packets transferred onto the DM bus are received at the scheduler 141 which assembles the transferred packets into a remultiplexed transport stream. Note that only selected transport packets of the received transport packets are transferred via the DM bus. Thus, the remultiplexed transport stream contains only selected transport packets for which a transfer indication was provided, namely, those transport packets containing the desired ESs and PSI.

Note that the MPEG-2 standard requires that the remultiplexed transport stream contain certain PSI reflecting its contents. For instance, the PAT must indicate the PID of the transport packets containing the program definitions of the PMT that relate the ES and programs contained in the transport stream. However, each received transport stream contains a PAT which is only self-referencing—the PAT of each received transport stream relates to the contents of only that transport stream and not the other received transport streams. Thus, the PAT in each received transport stream must be discarded and a new PAT reflecting the contents of the to-be-remultiplexed transport stream must be substituted therefor. Assume that the PIDs of the ESs, and other PAT information, are known ahead of time. The processor 131 (or the remote controller computer station 70 in conjunction with the processor 131) generates a substitute PAT reflecting only the contents of the to-be-remultiplexed transport stream. The processor 131 places the PAT entries in appropriate transport packets and queues up the substitute PAT bearing transport packets in the downstream message sender 135. The downstream message sender 135 signals the scheduler 141 via the C bus when it is non-empty. In response, the scheduler 141 "schedules" the transmission of transport packets from the downstream message sender 137 by transferring to the downstream message sender 137 a control signal for enabling the transfer of transport packets on the DM bus at the appropriate time. In response, the downstream message sender 137 transfers its substitute PAT bearing transport packets on the DM bus.

Meanwhile, the DLM 110 is instructed to discard the PAT bearing transport packets of each inputted bitstream. That is, the processor 131 provides, for the PID corresponding to the transport packets containing the PAT, indicators for refraining from transferring the corresponding received transport packet onto the DM bus. (Note that MPEG-2 requires that the PAT, and only the PAT, be carried in transport packets with the PID 0x0000. Thus it is a trivial matter to know ahead of time which transport packets carry the PAT.) Thus, the DLM 110 does not transfer received transport packets bearing the original PATs onto the DM bus. It should be noted that the PAT references the program definitions of the PMT carried in each respective stream, as well as conditional access entries of a conditional access table or CAT. Thus, the processor 131 should download to the DLM 110 a transfer indication for the PIDs of such PMT, CAT and other PSI information, so that such transport packets are extracted and transferred onto the DM bus for assembly into the remultiplexed transport stream. As a result, the combination of the desired ES bearing transport packets, CAT, PMT and possibly other PSI bearing transport packets and substitute PAT bearing transport packets are assembled into the remultiplexed transport stream.

Consider the case where certain information is not known ahead of time regarding the inputted transport streams such as which programs are contained therein (their program number) which ESs comprise each program and their PIDs, etc. Such information can be discerned from the inputted transport streams by retrieving the PAT of the inputted transport stream to find the PIDs of the transport packets bearing the program definitions of the programs carried in the respective inputted transport stream. The transport packets carrying the program definitions of desired programs can then be retrieved to determine which ESs comprise the desired programs, the PIDs of the transport packets bearing the ESs of the desired programs and the PIDs of the transport packets carrying the PCRs of the desired programs. To retrieve such transport packets for examination, the processor 131 (or processor in conjunction with the remote controller computer station 70) transfers the PID of the transport packets containing the PAT (i.e., PID 0x0000), and a capture indication to the DLM 110. In response, the DLM 110 "captures," i.e., extracts and transfers via the C bus to the processor 131, the transport packets bearing the PAT. The processor 131 can examine the contents of such transport packets to determine the PIDs of the transport packets carrying the program definitions of desired programs. The processor 131 (or processor 131 in conjunction with the remote controller computer station 70) transfers a capture indication for the PIDs of the transport packets containing the program definitions of the desired programs to the DLM 110. In response, the DLM 110 "captures," i.e., extracts and transfers via the C bus to the processor 131, the transport packets bearing the program definitions of the desired programs. The processor 131 can examine the contents of such transport packets to determine the ESs that make up each program and the PIDs of the transport packets carrying them. The processor 131 can also discern the PIDs of other program relevant transport packets, such as the PIDs of the packets carrying ECMs for each ES, or the PIDs carrying the PCR's of the program. Then, the processor 131 can accordingly transfer appropriate transfer and capture indications for certain PIDs to the DLM 110 to achieve a multiplexing of only desired transport packets.

The DLM 110 may also be used to transfer messages, such as "upstream" or "downstream" directed messages. Upstream directed messages are transmitted from the remultiplexer 100 in transport packets having a particular PID to a device which transfers a to-be-remultiplexed transport stream to the inputs M2S port 3, M2S port 4, M2S port 5 or M2S port 6. Upstream directed messages are received by the remultiplexer 100 from a device which receives the remultiplexed transport stream from the remultiplexer 100 via the outputs M2S port 1 and M2S port 2. Downstream directed messages are transmitted to the remultiplexer 100 in transport packets having a particular PID from a device which transfers a to-be-remultiplexed transport stream to the inputs M2S port 3, M2S port 4, M2S port 5 or M2S port 6. Downstream directed messages are transmitted from the remultiplexer 100 to a device which receives the remultiplexed transport stream from the remultiplexer 100 via the outputs M2S port 1 and M2S port 2. To that end, the processor 131 (or processor 131 in conjunction with the remote controller computer station 70) can transfer to the DLM 110, a capture indication to for the PIDs to be used for downstream directed messages. Using the mechanism described above, the DLM 110 extracts and captures for transfer to the processor 131 downstream directed messages in transport packets having the appropriate PID. The processor 131 retrieves the messages in such packets and may perform different kinds of processing, including modifying the control of the remultiplexer 100. Upstream directed messages generated by the processor 131 are transferred to the upstream message sender 137 where they are stored in a FIFO. The upstream directed messages are then transferred from the upstream message sender 137 to the DLM(s) 110 via the UM bus. Such upstream directed messages are illustratively received at all DLMs 110 installed at the remultiplexer 100 and transmitted from each input port M2S port 3, M2S port 4, M2S port 5 and M2S port 6 of each DLM 110 to the devices which provide to-be-remultiplexed transport streams to the remultiplexer 100. Thus, the messages in the transport packets illustratively have headers including addresses or identifiers of some kind to indicate which of the upstream (or downstream) devices is to receive the message bearing transport packet.

As mentioned above, MPEG-2 requires that each PID be unique to its contents within its respective transport stream. However, such PIDs may not be the desired PIDs. For instance, they may conflict with the PIDs of other transport streams to be introduced further downstream. Alternatively, two transport streams received at different DLMs 110 of the remultiplexer may use the same PIDs to refer to different contents. To solve such problems, the DLM 110 can achieve a remapping of PIDs of transport packets received from the inputted transport streams. In addition to transferring indicators as to whether or not transfer or capture transport packets, the processor 131 transfers a new PID for each PID of each transport packet to be captured or transferred. The new PID may be identical the PID of the received transport packet to which it corresponds or may be different. When the transport packet is received, the new PID is substituted for the old PID prior to capture or transfer.

Consider now that multiple transport streams are received in parallel at the DLM 110. However, the transport packets of these transport streams are serially transmitted on the DM bus for assembly into the outputted remultiplexed transport stream. Furthermore, multiple DLM's 110 may be operating simultaneously in the remultiplexer 100, but all share a single DM bus. Therefore, packets may be buffered or enqueued in the DLM 110 for some time. This presents a jitter problem for the transport stream. Specifically, each transport stream carries PCR's for recovering a program clock of each program carried therein. The PCR's are "snapshots" of the program encoder clock used to encode the ES's of the respective program. Therefore, if transport packets carrying PCR's are delayed, they may arrive at a time that does not reflect the time indicated by the PCR's. Such jitter can disrupt the smooth display and synchronization of video and audio.

To overcome this problem, the DLM 110 keeps track of the time each transport packet carrying a PCR is received. The DLM 110 also keeps track of when the PCR bearing transport packet is transferred on the DM bus. Prior to transfer, the DLM 110 determines the "dwell" time or time in which the PCR bearing transport packet has been enqueued in the DLM 110. This dwell time is added to the PCR of the transport packet prior to transfer on the DM bus.

Note that it is important not to over-adjust the PCR's. This is because the ES data of the transport packets are decoded and presented in accordance with DTS and PTS values which reference the PCR. Some divergence of the PCR's from the original values is tolerable. However, even small incremental changes can add up to a large divergence, especially if PCR's are adjusted by several downstream devices. To avoid over-adjustment of the PCR's, an average dwell time of each transport packet is subtracted from the adjustment value to be added to the PCR's. Thus, the PCR's are adjusted based on a relative jitter amongst the transport packets to be remultiplexed together.

Figure 3:
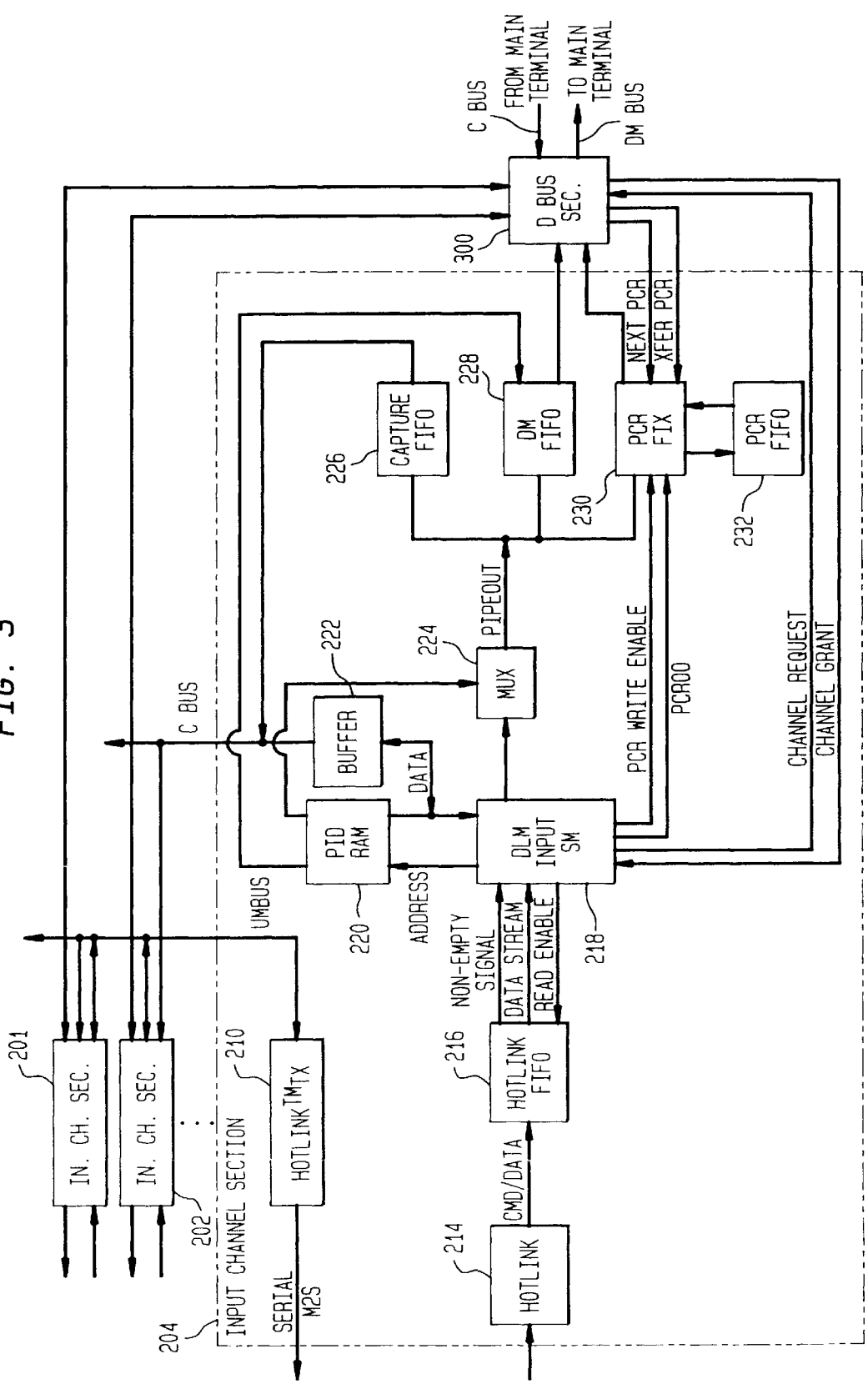
FIG. 3 shows a data link module (DLM) of the remultiplexer of FIG. 2 in greater detail.

FIG. 3 depicts a block diagram of the DLM 110. As shown, the DLM 110 includes one input channel section 201, 202, . . . 204 for each of the input ports M2S port 3, M2S port 4, M2S port 5 and M2S port 6 (for a total of four input channel sections). Each input channel section 201, 202, 203 or 204 is connected to a respective one of the input ports (i.e., the section 201 is connected to the input port M2S port 3, the section 202 is connected to the M2S port 4, etc.), the C bus, the UM bus and the DM bus section 300. One such input channel section 204 is shown in greater detail.

Messages (in transport packets) from the upstream message sender 137 are received at a HOTLinks™ transmitter 210 via the UM bus. The HOTLinks™ transmitter 210 converts the transport packet to HOTLinks™ format and transmits the converted packet on its respective input port M2S port 6 to the device which provides the input to-be-remultiplexed transport stream on input port M2S port 6.

Transport packets of an inputted to-be remultiplexed transport stream are transmitted in HOTLinks™ format via the respective input port M2S port 6. These transport packets are received at the HOTLinks™ receiver 214. The HOTLinks™ receiver 214 both converts the data from 10 bit format to eight bit format and performs a certain amount of error correction and detection. To that end, the HOTLinks™ receiver 214 uses a look-up table for converting various received 10 bit values to their corresponding eight bit value. The HOTLinks™ receiver 214 is therefore capable of generating a certain limited number of error signals indicative of one or more error conditions related to the inputted transport stream.

The byte sized data units thus recovered, and error signals are outputted to a HOTLinks™ FIFO 216 where the data is stored for processing. As soon as the FIFO 216 has some data, the FIFO 216 outputs a non-empty signal to a DLM input state machine 218. The DLM input state machine 218 is a finite state machine that can be formed from a field programmable gate array (FPGA). When the DLM input state machine 218 is ready to process the next transport packet, it transmits a read enable signal to the FIFO 216. This causes the very next transport packet to be transferred to the DLM input state machine 218.

The DLM input state machine 218 monitors the received data carefully to determine if it contains errors. There are two particular error situations which the DLM input state machine can detect and to which the DLM input state machine 218 can respond. In the first situation, the sync start byte is missing from the beginning of the transport packet or was received in corrupted form. In such a case, the DLM input state machine 218 discards the entire transport packet. This is achieved by simply not enabling any of the other circuitry in the input channel section 204 to store the transport packet. In the second situation, the sync byte is detected at the start of the transport packet but data is missing from the transport packet (short packet situation) or the data of the packet is detected with errors (as indicated by error signals outputted by the HOTLinks™ receiver 214). In such a case, the DLM input state machine 218 pads out the remainder of the transport packet with a default value and discards it.

Assume that a transport packet is received intact by the DLM input state machine 218. The DLM input state machine 218 parses out the PID from the transport packet and inputs this extracted PID as an address to a PID RAM 220. The PID RAM 220 stores a two byte value for each possible address (i.e., each PID). Illustratively, these two byte values are stored in the PID RAM by the processor 131, which transfers the two byte values to the PID RAM 220 via the C bus and buffer 222. Each two byte value includes a substitute PID and multiple indicators. Note that a PID is a 13 bit value. Thus, each two byte value uses thirteen bits for the substitute PID and has three bits left over for use as indicator bits. Illustratively, one bit is used as a transfer indicator and one bit is used as a capture indicator. These indicators are outputted to the DLM input state machine 218 for purposes of controlling the capturing and transfer onto the DM bus of the transport packet. That is, the transfer bit controls the transferring of the transport packet onto the DM bus for assembly into the remultiplexed transport stream. The capture bit controls the capturing of the transport packet, i.e., transfer of the packet via the C bus to the processor 131 for detailed analysis. The manner of control is described below. In addition, the PID RAM 220 outputs the new PID portion of the addressed two byte value to the multiplexer 224. The DLM input state machine 218 outputs its transport packet, except for the 13 bits corresponding to the old PID, to the multiplexer 224. In place of the old PID, the multiplexer 224 inserts the new PID retrieved from the PID RAM 220.

The transport packet, with new appended PID, is outputted to a capture FIFO 226, a DM FIFO 228 and a PCR fixer circuit 230. The capture FIFO 226 is for storing the transport packets that are "captured" prior to transfer on the C bus to the processor 131. The DM FIFO 228 is for storing packets that are to be transferred on the DM bus for assembly into the remultiplexed transport stream. The PCR fixer 230 is for correcting PCR's of the transport packets to reflect the dwell time or delay incurred by the transport packets while enqueued in the DM FIFO. The PCR fixer 230 is discussed in greater detail below. The capture FIFO 226 and the DM FIFO 228 receive enable signals from the DLM input state machine 218 for enabling the storage of transport packets. The capture FIFO enable signal is activated by the DLM input state machine 218 in response to the capture indicator retrieved from the PID RAM 220. For example, the DLM input state machine 218 only outputs a capture enable signal for storing transport packets in the capture FIFO 226 when the retrieved capture indicator indicates that transport packets with the respective PID should be captured (e.g., when set to logic '1'). Otherwise (when the capture indicator bit is logic '0'), the DLM input state machine 218 does not output an enabling signal to the capture FIFO 226 and no transport packets are stored therein. Likewise, the DLM input state machine 218 outputs a DM FIFO enabling signal if the transfer bit indicates that the transport packet should be transferred on the DM bus and refrains from outputting the enable signal otherwise.

When the capture FIFO 226 has any data stored therein, it outputs to the processor 131 via the C bus a non-empty signal as a request for transfer. In response, the processor 131 issues a control signal enabling transfer of transport packets in the capture FIFO 226 via the C bus, when the processor 131 is ready to receive the packets.

The DLM input state machine, after transferring the 188th byte of its transport packet to the DM FIFO 228 issues a request signal CHREQ to transfer the packet from the DM FIFO 228 to the DM bus section 300. When the DM bus section 300 is ready to receive the transport packet, the DM bus section transmits a request granted signal CHSEL to the DLM input state machine 218. In response, the DLM input state machine 218 enables the outputting of a transport packet from the DM FIFO 228 (as described below).

Note that transport packets may be stored in either the capture FIFO 226 or DM FIFO 228, both of these FIFOs 226 and 228 simultaneously or in neither FIFO 226 and 228. The latter situation may arise because the transport packet contained errors, as discussed above. The DLM input state machine 218 outputs a control signal to the PCR fixer 230 indicating when the PCR of the transport packet is transferred out of the multiplexer 224. As per the MPEG-2 specification, if a PCR is present in a transport packet, it is located at a particular location within the transport packet. Specifically, the transport packet header adaption field control bits will indicate that it has an adaption field and the adaption field will have a PCR_flag set to indicate that a PCR is present. If present, the PCR is located at a specific offset from the sync byte of the transport packet and is 42 bits long (including a 9 bit PCR extension of a 27 MHZ clock and a 33 bit PCR base of a 90 kHz clock). The first control signal causes the PCR fixer 230 to store the PCR of the transport packet in the PCR FIFO 232. (Illustratively, only the 33 bit PCR base is stored.) The receipt time, as indicated by a free running clock at the PCR fixer 230 is also stored with the PCR of the transport packet. When the DM bus section 300 enables the transfer of a transport packet from the DM FIFO 228, the DM bus section 300 examines the transport packet to determine whether or not a PCR is contained therein. If so, the DM bus section 300 issues a control signal for causing the PCR fixer 230 to output a corrected PCR. In response, the PCR fixer 230 retrieves the PCR and receipt time stamp from the PCR FIFO 232. The PCR fixer 230 also obtains the current count of the free running clock thereat, as a transfer time stamp, and performs the following calculation:

New_PCR=Old_PCR−Receipt_time−Average_ dwell_time+Transfer time (1) where average dwell time is the average delay incurred by all transport packets in the DM FIFO 228. The PCR fixer 230 outputs this new PCR to the DM bus section 300 where it is appended in place of the current PCR of the transport packet transferred from the DM FIFO 228.

Figure 4:
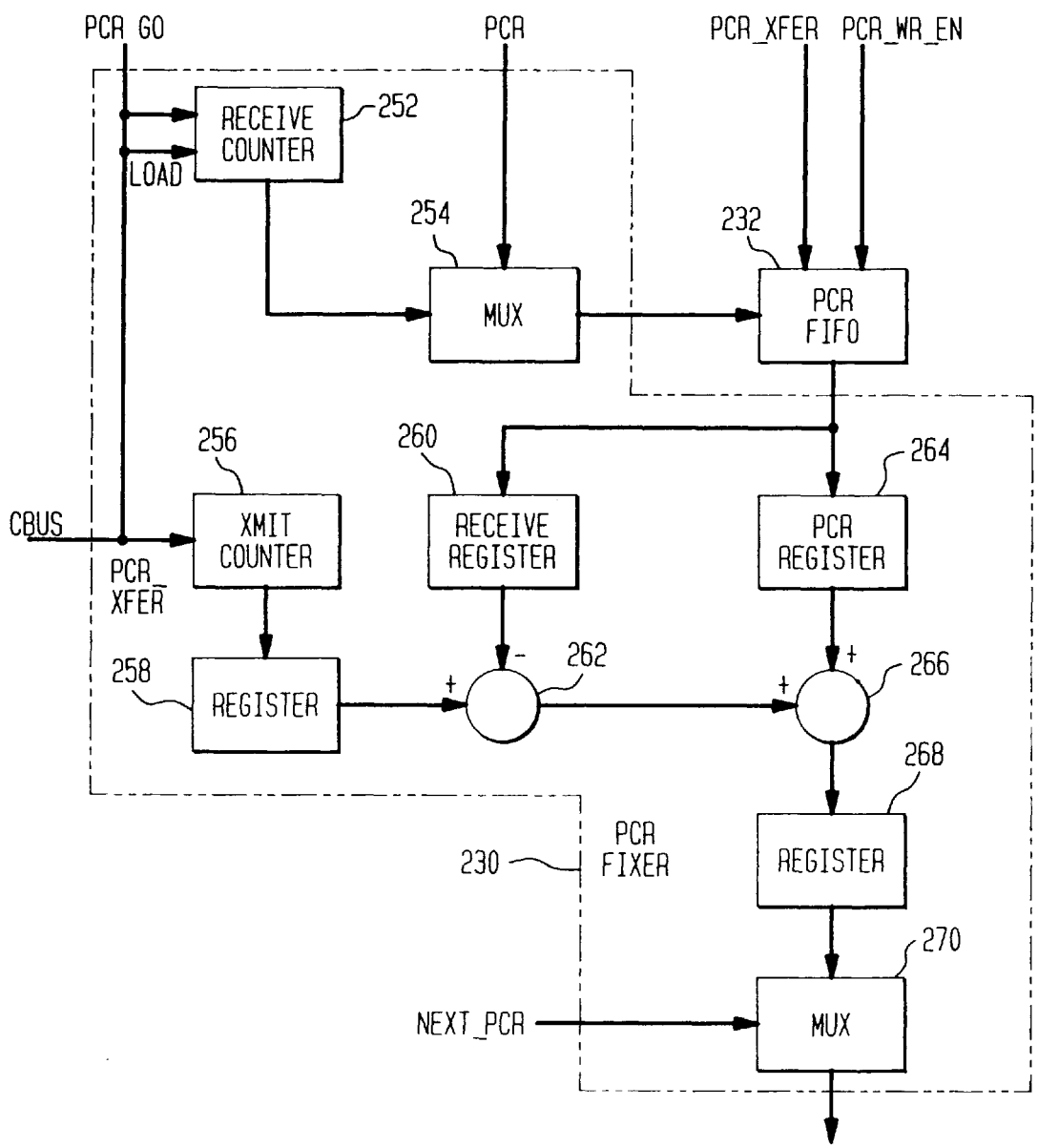
FIG. 4 shows a PCR fixer circuit of the DLM of FIG. 3 in greater detail.

FIG. 4 illustrates the PCR fixer 230 and PCR FIFO 232 in greater detail. A PCR of a transport packet is transferred from the multiplexer 224 (FIG. 3) to the multiplexer 254. Simultaneously, the DLM input state machine 218 outputs a signal PCR_GO (via the C bus) to a receive counter 252 which is a free-running clock. This causes the current count of the receive counter 252 to be appended, as a receive time, to the PCR received at the multiplexer 254. (Note that the count of the receive counter 252 is initially loaded to be a current count plus the average dwell time in the DLM 110 via the C bus using the processor 131.) The DLM input state machine 218 also outputs a signal PCR_WR_EN to the PCR FIFO 232 for enabling the storage of the combined PCR and received time value in the PCR FIFO 232.

When the DM bus section 300 is ready to receive a transport packet, it signals the DLM input state machine 218 with the signal CHSEL. When ready, the DM bus section 300, amongst other things, outputs a control signal PCR_ XFER which is received at the transmit counter 256 and the PCR FIFO 232. The transmit counter 256 is similar to the receive counter 254 and counts in synchronism. However, the transmit counter 256 does not have the average dwell time added to its count. The signal PCR_XFER causes the current count of the transmit counter to be loaded into the register 258 as the transfer time. The signal PCR_XFER causes the next PCR and receive time to be outputted and stored in the PCR register 264 and the receive time register 260, respectively. The adder 262 subtracts the receive time (which is really the sum of the receive time and the average time) from the transmit time. This difference is then added to the old PCR in the adder 266. The new PCR thus computed is stored in the register 268. A control signal NEXT_PCR is outputted from the DM bus section 300 to the multiplexer (or tri-state buffer) 270 for outputting the new PCR to the DM bus section 300.

Figure 5:
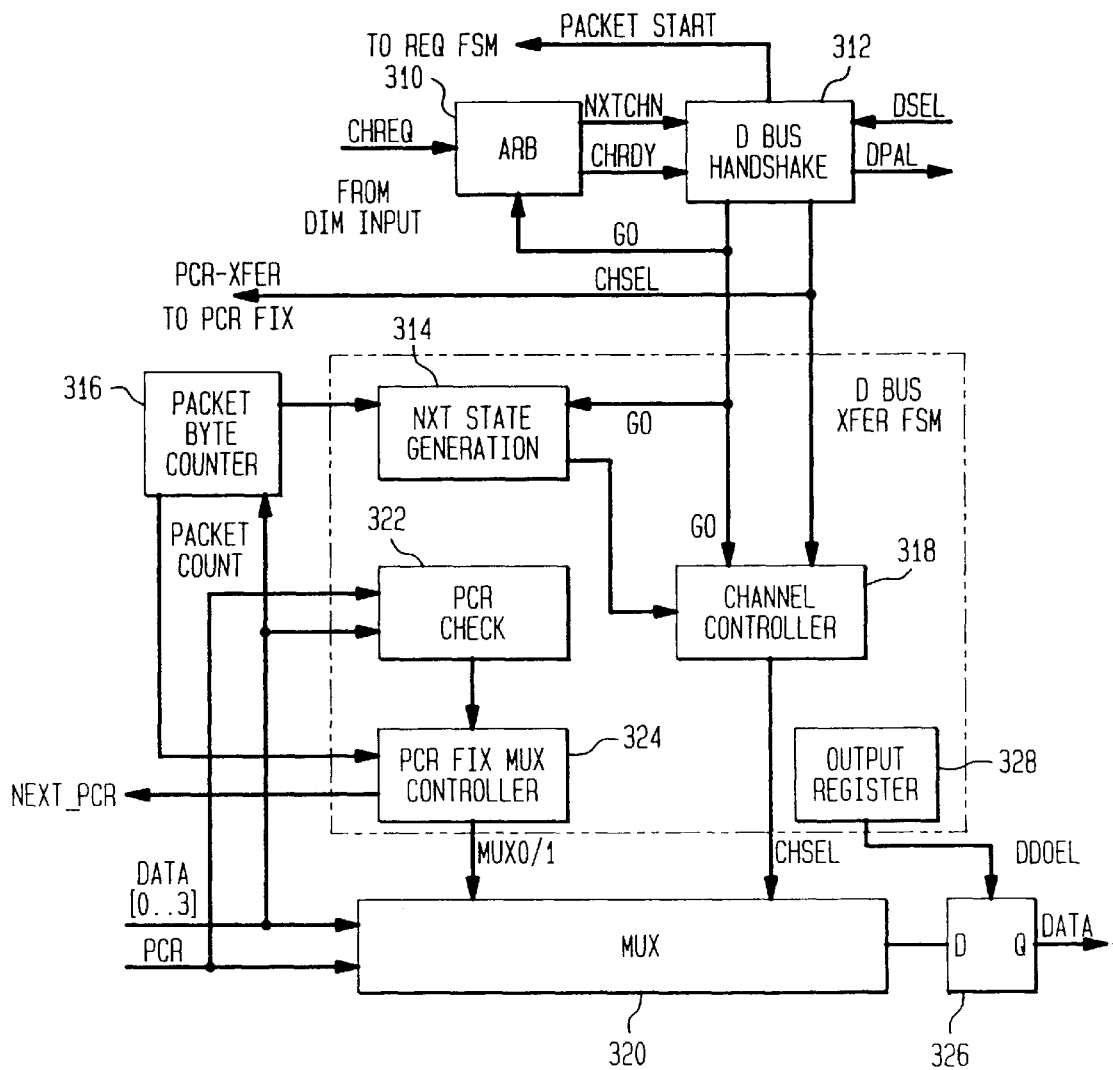
FIG. 5 shows a DM bus section of the DLM of FIG. 3 in greater detail.

FIG. 5 shows the DM bus section 300 in greater detail. As shown, channel requests CHREQ are received from each DLM input state machine 218 (FIG. 3) of the DLM 110 (FIG. 2) at an arbitrator circuit 310. Using, for example, a round-robin scheduling scheme, the arbitrator 310 selects one of the input channel sections 201–204 (FIG. 3) for which a request has been made and outputs a signal NXTCHN indicative of the selected input channel section 201–204. The arbitrator 310 also outputs a signal CHRDY indicating that it has at least one transport packet ready for transfer to the scheduler 141 (FIG. 2). These two outputted signals NXTCHN and CHRDY are received at a D bus handshake circuit 312. As noted above, the remultiplexer 100 may have several DLM's 110 connected to the same bus. In a similar fashion as the arbitrator 312, the scheduler 141 (FIG. 2) arbitrates amongst all of the DLM's 110 (and other devices) which wish to transfer their packets on the DM bus. This is achieved as follows. In response to the NXTCHN and CHRDY signals, each DLM 110 outputs from its D bus handshake circuit 312 a DPAL signal indicating that it has a transport packet available to transmit on the D bus. The scheduler 141 (FIG. 2) arbitrates amongst the DPAL signals of the DLM's 110 and, for example, using a round-robin scheduling scheme, selects one DLM 110. The scheduler 141 transmits back a signal DSEL to the D bus handshake circuit 312 which has been selected to transfer transport packets onto the DM bus.

In response to receiving the signal DSEL, the D bus handshake circuit 312 outputs a GO signal to the arbitrator 310 to indicate that the scheduler 141 (FIG. 2) is ready top receive a transport packet from the selected input channel section 201–204. The D bus handshake circuit 312 also outputs the CHSEL signal to the PCR fixer 230 (FIG. 3) and DLM input state machine 218 (FIG. 3) of the appropriate input channel section 201–204. This signal CHSEL serves as the PCR_XFER signal.

The GO signal is also received at a next state generator circuit 314. The next state generator 314 also receives a count from a packet byte counter 316 which counts the number of bytes transferred into the DM bus section 300. The next state generator 314, in conjunction with the packet byte counter 316, ensures that the no more than one transport packet (i.e., 188 bytes for a transport packet) is transferred from the respective input channel section 201–204. The next state generator 314 issues control signals to, amongst other circuits, the channel controller 318 for indicating that a whole transport packet is transferred and that the channel controller 318 should disable the receipt of data from the selected input channel section 201–204 (FIG. 3).

The channel controller 318 receives the signal CHSEL indicating the channel, i.e., input channel section 201–204 (FIG. 3) from which data should be received. In response, the channel controller 318 outputs an appropriate control signal to the multiplexer 320 for selecting the output of the appropriate input channel section 201–204 as indicated by CHSEL. The multiplexer 320 is connected to the output of the DM FIFO 228 of each input channel section 201–204 and can select to receive data from any one of the input channel sections 201–204.

As the transport packet data is received from the selected input channel section 201–204, the PCR check circuit 322 monitors the transport packet data to determine whether or not a PCR is present therein. (As noted above, this can be achieved using simple parsing for the adaption field control bits and the PCR_flag bit). If the transport packet does contain a PCR, then the PCR check circuit 322 outputs an appropriate control signal for enabling the PCR fixer multiplexer controller circuit 324. The PCR fixer multiplexer controller 324 also receives the current packet count from the packet byte counter 316. When enabled, at the time corresponding to the transfer of the PCR of the transport packet (received from the DM FIFO 230), the PCR fixer multiplexer controller 324 outputs the signal NEXT_PCR to the PCR fixer 230 (FIG. 3) of the selected input channel section 201–204. This causes the PCR fixer 230 (FIG. 3) to output the new PCR at the appropriate time (in sync with the old PCR in the transport packet outputted from the DM FIFO 228 of FIG. 3). At the time corresponding to the transfer of the old PCR currently in the transport packet, the PCR fixer multiplexer controller 324 outputs a control signal for switching the receipt of data to the new PCR rather than the old PCR. This causes the new PCR, as adjusted for dwell time, to be substituted into the transport packet outputted from the DM FIFO 228. The transport packet thus formed, is outputted via latch 326 under control of output register controller circuit 328. The output register controller circuit 328 ensures that only 188 bytes are outputted from the DM bus section 300.

Figure 6:
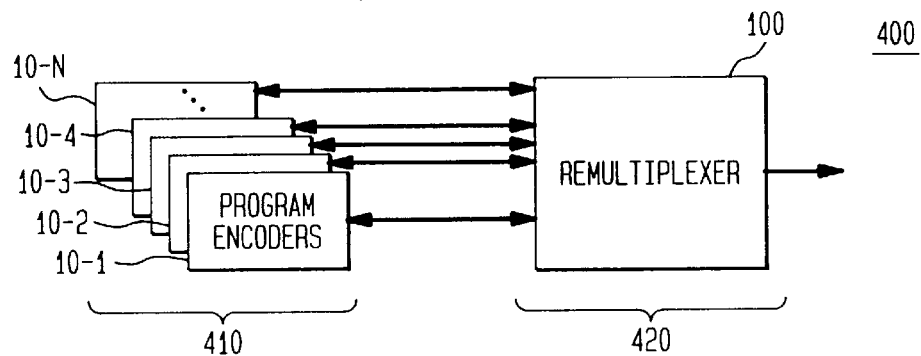
FIG. 6 shows a first cascade configuration in greater detail.

Turning now to FIG. 6, a first cascade configuration 400 is shown with plural program encoders 10-1, 10-2, 10-3, 10-4, . . . , 10-N. As noted above, the remultiplexer 100 illustratively supports four DLMs 110 (FIG. 2) and each DLM 110 supports up to four inputted transport streams for a total of 16 inputted transport streams. Also as noted above, the program encoders 10-1 to 10-N all output single program transport streams although, as shown below, the remultiplexer 100 can handle multiple program transport streams. The encoders 10-1 to 10-N may select arbitrary PIDs for certain PSI (not otherwise specified in MPEG-2) and all ESs provided that the PIDs of the transport streams inputted to any one DLM 110 are mutually unique (except of course for those PIDs specified by MPEG-2 to be certain values). In such a case, the DLMs 110 can be programmed with substitute PIDs to ensure uniqueness in the remultiplexed transport stream outputted from the remultiplexer 100.

The program encoders 10-1 to 10-N form a first stage 410 of the cascade configuration 400. They each output single program bearing transport streams. The remultiplexer 100 forms a second stage 420 of the cascade configuration 400. The remultiplexer 100 can be programmed to selectively select and multiplex together the programs and/or individual ESs of the single program transport streams inputted thereto. While doing so, the remultiplexer 100 adjusts certain PSI, in particular, the PAT, to reflect only the contents of the remultiplexed transport stream.

In the course of operation, the program encoders 10-1 to 10-N may transmit downstream directed messages to the remultiplexer 100 and the remultiplexer 100 may transmit upstream directed messages back to the program encoders 10-1 to 10-N. Such messaging is very fast—indeed, much faster than the Ethernet—for purposes of propagating time sensitive messages. For example, the remultiplexer 100 may use the messaging to dynamically allocate bandwidth according to a statistical multiplexing scheme. For example, each time a program encoder, e.g., the program encoder 10-1 completes the encoding of a video frame, the program encoder 10-1 transmits a downstream directed message indicating how difficult the frame was to encode. The remultiplexer 100 collects such messages at the processor 131 (FIG. 2) thereof. The processor 131 processes these messages in an attempt to take bandwidth from the program encoders producing encoded frames with very high quality and give some of that bandwidth to the program encoders producing encoded frames with lower quality encoding. The remultiplexer 100 then transmits an upstream directed message (which is broadcasted to all program encoders 10-1 to 10-N) that reallocates the bandwidth to equalize the encoding quality. Thus, if one program encoder encodes a talk show, with little motion (and low bandwidth requirement), and a second program encoder encodes a sport event, with high motion (and a high bandwidth requirement), the remultiplexer 100 will attempt to allocate more bandwidth to the second program encoder than the first.

Another use of the message passing mechanism is for synchronizing two program encoders, e.g., the program encoders 10-1 and 10-N. Such synchronization may be desirable in a situation where two (or more) program encoders 10-1 and 10-N are encoding different ESs of the same program. For instance, the program encoder 10-1 may encode the video ES and the program encoder 10-N may encode the audio ES in an audio dubbing operation. Without mutual synchronization, each program encoder 10-1 and 10-N will output PCRs for different, independent time bases and PTSs and DTSs relative to those different time bases. This would render simultaneous presentation of the two ESs of the program difficult, if not impossible, since the PTSs and DTSs associated with each ES reference an independent time base (as established from the divergent PCRs) produced by the program encoder which encoded that particular ES.

Figure 10:
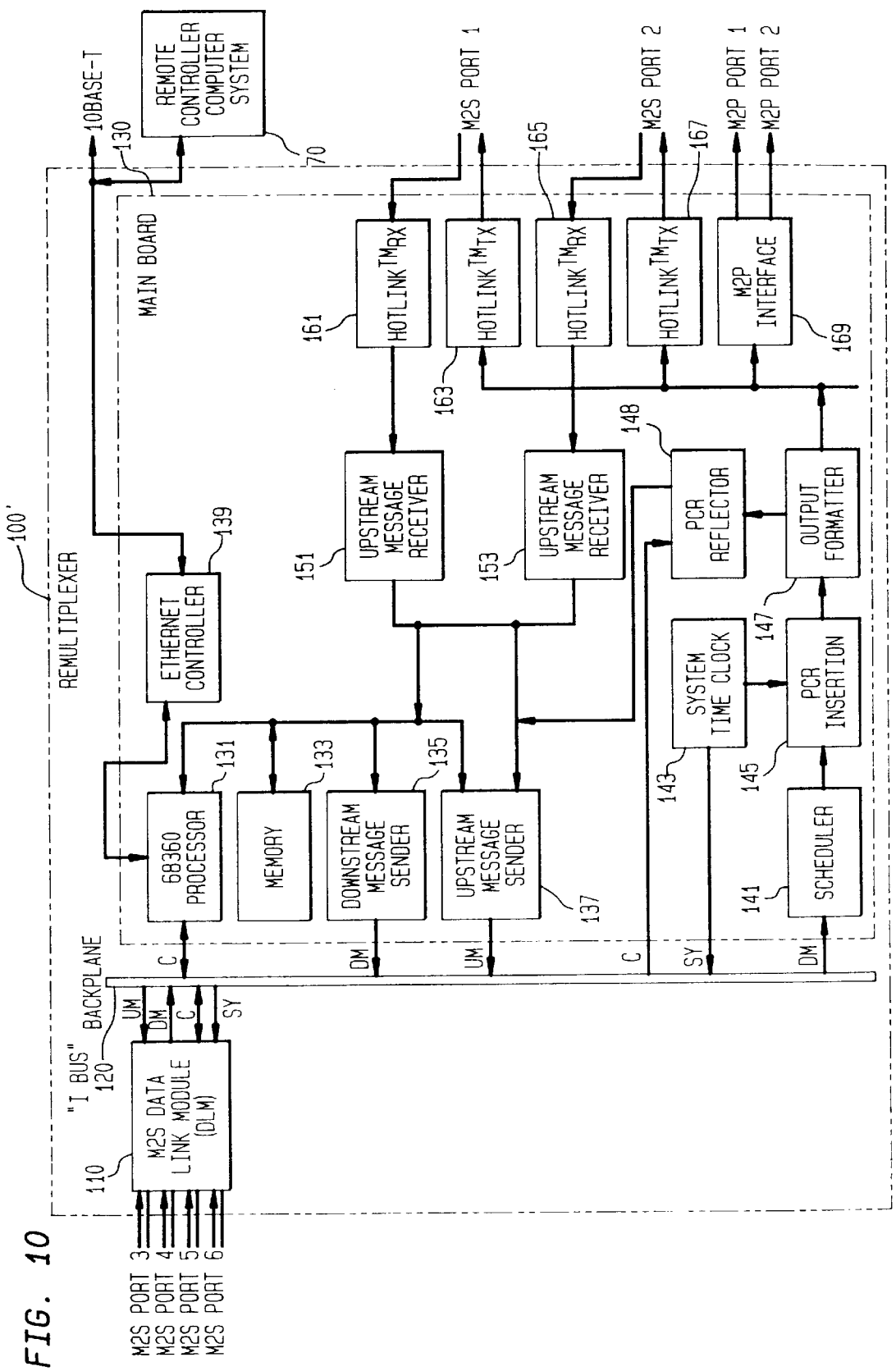
FIG. 10 shows a modified remultiplexer according to an embodiment of the present invention.

To overcome this problem, one of the program encoders, e.g., the program encoder 10-1, is selected as the master program encoder for producing a master time base. The remultiplexer 100 is adapted to reflect the transport packets from the master program encoder 10-1 that contain the PCRs of the master time base bask to the slave program encoders 110-N on the upstream channel. FIG. 10 shows a remultiplexer 100' which is adapted to produce such a reflection. As shown, the remultiplexer 100 is identical to the remultiplexer 100 of FIG. 2 except that it has a PCR reflector circuit 148. The PCR reflector circuit 148 illustratively is a finite state machine and may be formed from an FPGA. The PCR reflector 148 receives one or more PIDs from the processor 131 via the C bus. In particular, the processor 131 transfers the PIDs of transport packets originating from the master program encoder 10-1 that contain the PCRs of the master time base. In response, the PCR reflector 148 copies, from the remultiplexed transport stream assembled by the scheduler 141, each transport packet containing a PID that matches a PID received from the processor 131, i.e., each transport packet containing a PCR of the master time base. The packets copied by the PCR reflector 148 are outputted to the upstream message sender 137. The upstream message sender 137 then outputs the copied transport packets onto the UM bus. From the UM bus, the DLMs 110 output the transport packets via the ports M2S port 3, M2S port 4, M2S port 5 and M2S port 6 to the program encoders 10-1 to 10-N.

Figure 9:
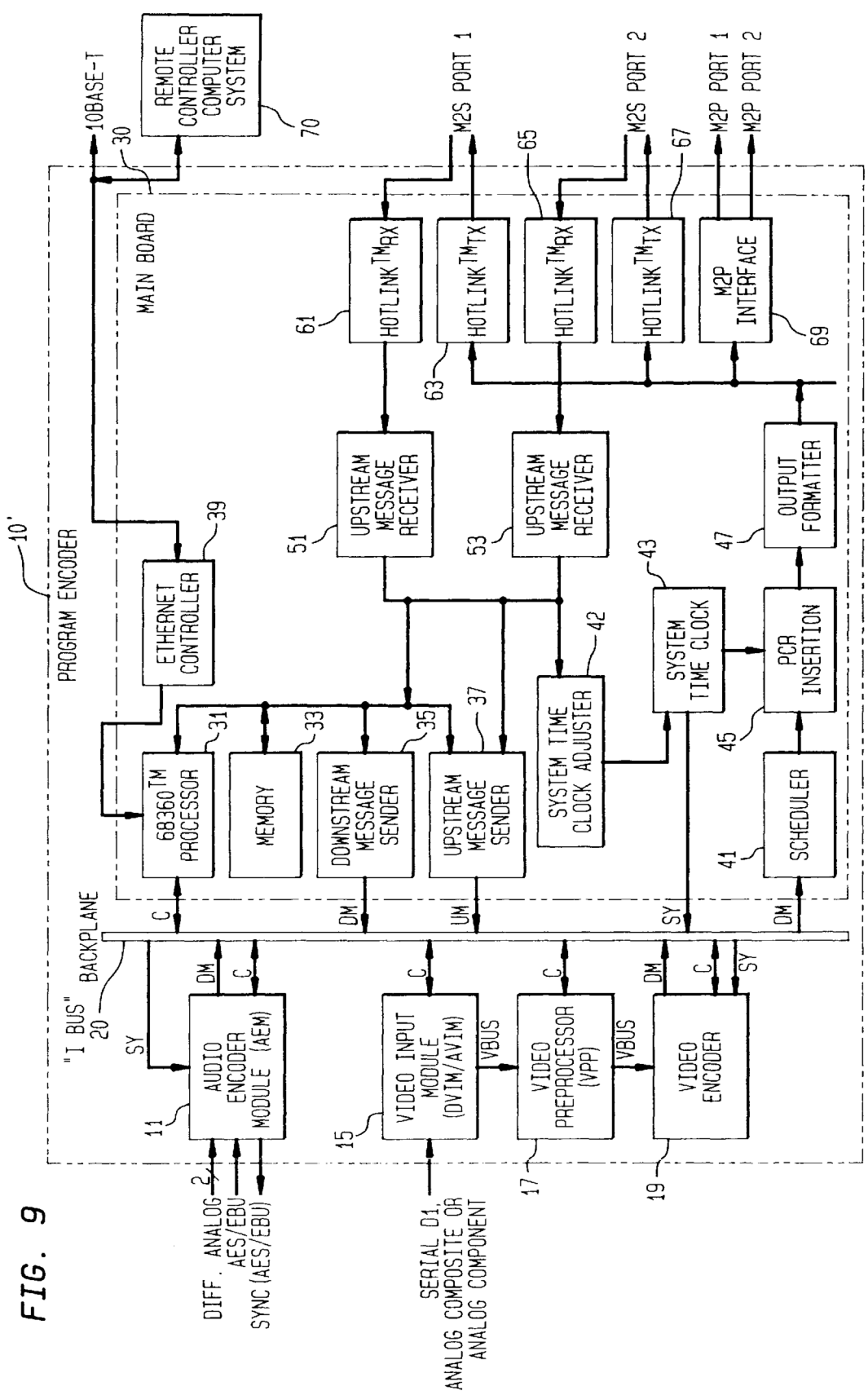
FIG. 9 shows a modified program encoder according to an embodiment of the present invention.

FIG. 9 shows a modified "slave" program encoder 10' which is identical to the program encoder 10 of FIG. 1 except that the program encoder 10' includes a system clock adjuster circuit 42. The system clock adjuster 42 may be a finite state machine formed from a FPGA, or processor. The upstream directed transport packets bearing the master time base PCRs are received at the upstream message receiver 51 or 53. The upstream message receiver 51 or 53 outputs the received transport packets to, amongst other devices, the system clock adjuster 42. Illustratively, the system clock adjuster 42 only responds to the transport packets containing the PCR bearing packets. To that end, the system time clock adjuster may parse the received packets for the adaption field bits and the PCR_flag bit to determine whether a PCR bearing packet was received. In response, the system clock adjuster 42 extracts the master time base PCR and adjusts the clock of the system time clock 43 in accordance therewith. Illustratively, an adjustment mechanism, such as is disclosed in U.S. patent application Ser. No. 08/497,690, entitled, "Transport Stream Decoder/Demultiplexer for Hierarchically Organized Audio-Video Streams," filed Jun. 30, 1995 for Emanuel Washington, et al. may be used in the system clock adjuster 42. The referenced application teaches a PCR counter loader mechanism and a PLL adjustment mechanism. Either (or both) mechanism may be included in the system time clock adjuster 42 to synchronize the system time clock 43 of the slave program decoder 10' to the master time base PCRs (and thus the master time base). Using the time base thus synchronized to the master time base, the slave program encoder 10-N encodes its ES in synchronism to the master time base, as re-established by the system time clock adjuster 42 and system time clock 43 at the slave program encoder 10-N. That is, the PCR's outputted by the slave program encoder 110-N (if any) are synchronous to the master time base in the master program encoder 10-1. Likewise, the PTSs and DTSs (if present) relate to the master system time base as reconstructed at the slave program encoder 10-N and are therefore synchronized to the master time base of the master program encoder 10-1.

Consider that the adjustment mechanism using the remultiplexer 100' (FIG 10) to reflect the master time base PCR bearing transport packets has a constant or nearly constant end-to-end delay (and is also very fast). The result is that little, if any, jitter is introduced into the slave transport streams. Such constancy in delay is difficult if not impossible to achieve using the Ethernet.

Figure 7:
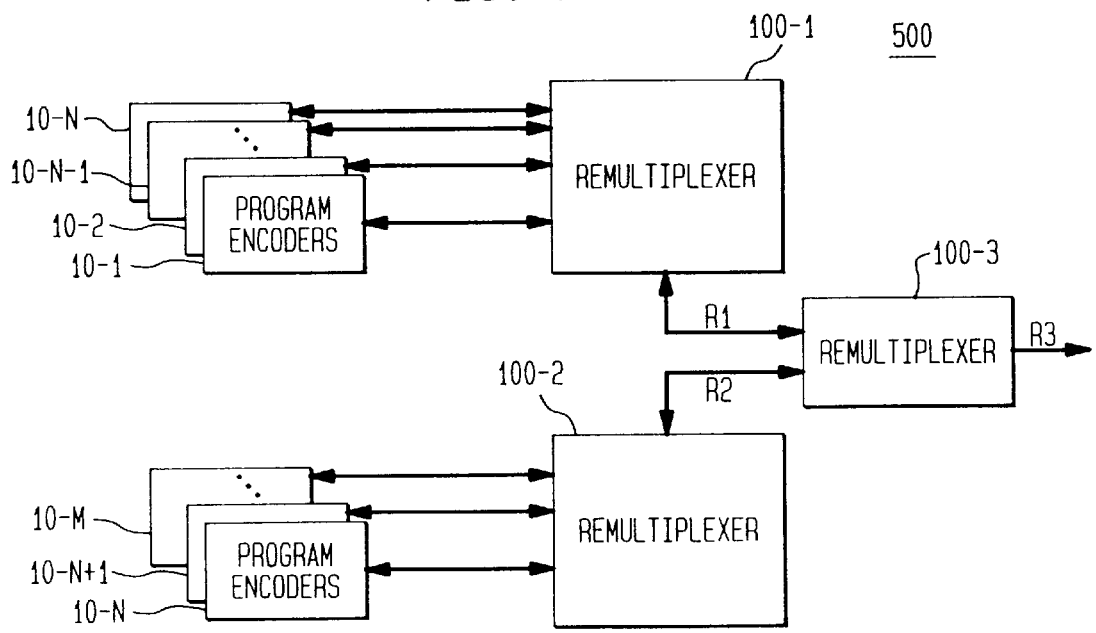
FIG. 7 shows a second cascade configuration using multiple stages of remultiplexers according to an embodiment of the present invention.

FIG. 7 shows another cascade configuration 500 including three remultiplexers 100-1, 100-2 and 100-3 and multiple program encoders 10-1, 10-2, ..., 10-N-1, 10-N, 10-N+1, ..., 10-M. The program encoders 10-1 to 10-N are connected to the DLM(s) of the remultiplexer 100-1. The connection of these remultiplexers is similar to the configuration 400 of FIG. 6. Likewise, the program encoders 10-N+1 to 10-M are connected to the DLM(s) of the remultiplexer 100-2. Each of the remultiplexers 100-1 and 100-2 outputs a remultiplexed transport stream R1 or R2. R1 contains selected elementary streams of the program encoders 10-1 to 10-N. Likewise R2 contains selected elementary streams of the program encoders 10-N+1 to 10-M.

The remultiplexed elementary streams R1 and R2 are received at the remultiplexer 100-3.

The remultiplexer 100-3, in turn, selectively remultiplexes the ESs contained in the transport streams R1 and R2 and outputs a further remultiplexed transport stream R3.

The program encoders 10-1 to 10-M form a first stage, the remultiplexers 100-1 and 100-2 form a second stage and the remultiplexer 100-3 forms a third stage. The configuration 500 is provided to illustrate how to multiplex more than the maximum number of input transport streams that any single remultiplexer 110-1, 100-2 or 100-3 can accommodate. Furthermore, the configuration 500 illustrates that multiple program bearing transport streams can be remultiplexed by the remultiplexer 100-3.

Figure 8:
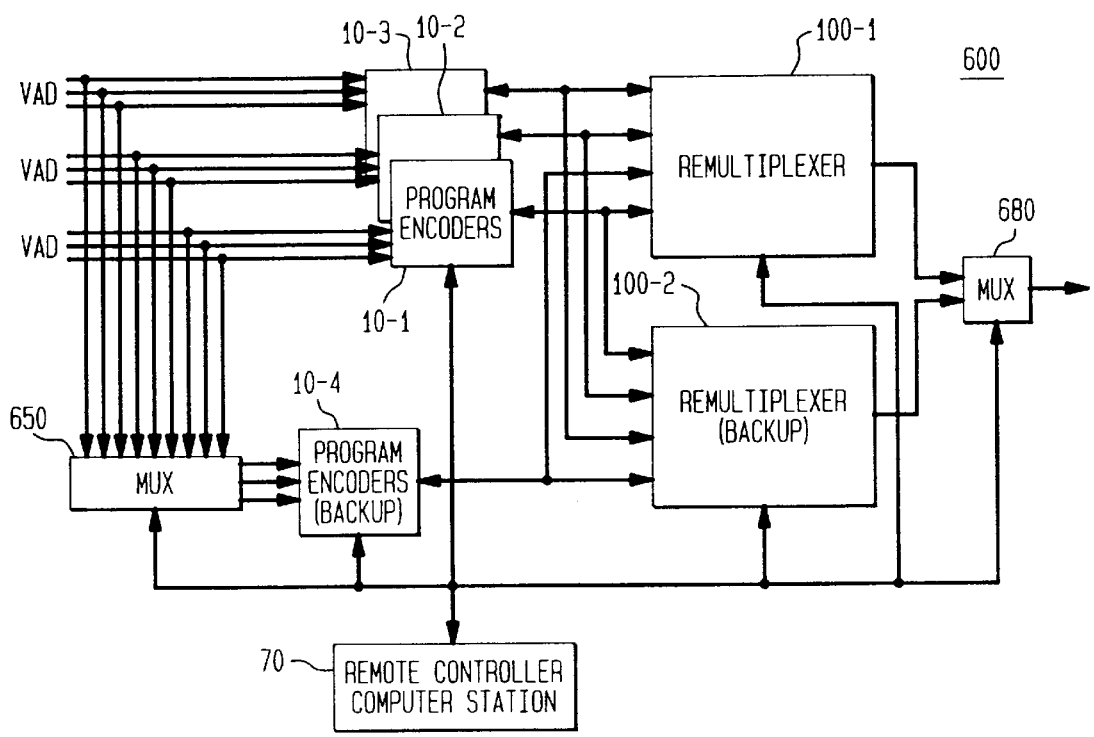
FIG. 8 shows a redundant cascade configuration according to an embodiment of the present invention.

FIG. 8 illustrates a redundancy configuration 600. As shown, three primary program encoders 10-1, 10-2 and 10-3 are provided which are connected to a primary remultiplexer 100-1. A fourth backup program encoder 10-4 is also provided which can be selectively connected to any one of the program sources of the program encoders 10-1, 10-2 and 10-3. This is illustrated as being achieved using a multiplexer 650 which receives each of the program inputs. Each program encoder 10-1 to 10-4 is also connected to a backup remultiplexer 100-2. The output of the two remultiplexers 100-1 and 100-2 are connected to the multiplexer 680.

The purpose of the backup program encoder 10-4 is to replace any one of the program encoders 10-1 to 10-3 if it should fail. Likewise, the backup remultiplexer 100-2 replaces the remultiplexer 100-1 if it should fail. Illustratively, the configuration 600 automatically detects a failure and initiates the backup program encoder 10-4 or remultiplexer. This can be achieved as follows. Illustratively, the HOTLinks™ protocol provides that the HOTLinks™ receivers generate an error message if they detect a signal loss from the transmitting device, e.g., as a result of a communication link failure or failure at the device itself. Regardless, such a message is indicative of an error at the device which transmits information to the respective port. Alternatively, each device may be required to transmit a so-called "heartbeat" message periodically on its respective links indicating that the device is functioning properly. Failure to receive such a message indicates a failure of the device at the transmitting end. However, the failure is detected, the devices respond as follows. If the remultiplexer 100-1 detects a failure of a single program encoder, e.g., the program encoder 10-1, the remultiplexer 100-1 can transmit a message, e.g., via the Ethernet LAN to the multiplexer 650 for selecting the video source previously encoded by the failed program encoder 10-1. The remultiplexer 100-1 can also send a message to the backup encoder 10-4 to turn it on and start transmitting the encoded program of the failed program encoder 10-1. If the program encoders 10-1 to 10-3 detect that the remultiplexer 100-1 has failed, they can transmit a message to the backup remultiplexer 100-2 to turn it on and to perform the same remultiplexing in place of the remultiplexer 100-1. Furthermore, the program encoders 10-1 to 10-3 can transmit a message to the multiplexer 680 to select the output of the backup remultiplexer 100-2. Alternatively, the remote controller computer station 70 detects the failures itself or is informed of the failures by the program encoders 10-1 to 10-3 or remultiplexer 100-1. In response, the remote controller computer station 70 performs the necessary activation of backup devices and selection of multiplexer 650 and 680 inputs or outputs.

In short, a remultiplexer, and method of remultiplexing are disclosed. The remultiplexer receives plural input transport streams at a data link module. The remultiplexer extracts transport packets of the received input transport streams. Depending on packet identifiers of the extracted transport packets, the remultiplexer sequentially transfers at least some of the extracted transport packets on a downstream bus. These transferred packets are then reassembled into a single output transport stream.

Finally, the discussion above is merely illustrative of the invention. Numerous alternative embodiments may be devised by those having ordinary skill in the art without departing from the spirit and scope of the following claims.

The claimed invention is:

1. A slave program encoder, for encoding at least a first one of the multiple elementary streams of a single program, wherein a master program encoder encodes at least a second one of said multiple elementary streams of said single program in synchronism with a master time base established within said master program encoder, said slave program encoder comprising:

an upstream message receiver which receives a packet containing a time stamp of said master time base, which time stamp originated at said master program encoder, was transmitted by said master program encoder to a downstream device and then transmitted from said downstream device to said upstream message receiver, a system time clock which establishes a time base at said slave program encoder to which the encoding of said at least first one of said multiple elementary streams is synchronized, and a system time clock adjuster, which responds to said time stamp of said master time base received at said upstream message receiver by adjusting said system time clock to synchronize to the received time stamp of said master time base so as to synchronize the presentation of said at least first one of the multiple elementary streams to said at least second one of the multiple elementary streams.

2. The slave program encoder of claim 1, wherein said at least first one of the multiple elementary streams represents a first audio program of a first language, and said at least second one of the multiple elementary streams represents a second audio program of a second language.

3. A method for encoding multiple elementary streams of a single program comprising:

in a master program encoder, encoding a first one of said elementary streams in synchronism with a master time base, outputting, from said master program encoder, transport packets containing time stamps of said master time base, encoded data of said first one of said elementary streams and presentation time stamps indicating a time at which said data of said first one of said elementary streams should be presented relative to said master time base, in a downstream device, extracting each of said transport packets containing one of said time stamps of said master time base and reflecting said extracted transport packets upstream to each program encoder connected to said downstream device, in a slave program encoder, receiving the reflected transport packets, synchronizing a clock therein to said master time base time stamps contained in the received reflected transport packets and encoding a second one of said elementary streams in synchronism to said master time base as re-established by said clock of said slave program encoder.

4. The method of claim 3 wherein said downstream device is a remultiplexer, said method further comprising the steps of:

outputting, from said slave program encoder, transport packets containing encoded data of said second elementary stream and a second group of presentation time stamps indicating a time at which said data of said second elementary stream should be presented, relative to said master time base, and remultiplexing said transport packets outputted by said master and slave program encoders in said remultiplexer to produce a single transport stream containing said single program.

5. The method of claim 3, wherein said at least first one of the multiple elementary streams represents a first audio program of a first language, and said at least second one of the multiple elementary streams represents a second audio program of a second language.

* * * * *

UNITED STATES PATENT AND TRADEMARK OFFICE
CERTIFICATE OF CORRECTION

PATENT NO.    : 6,002,687
DATED         : December 14, 1999
INVENTOR(S)   : Mark Magee et al.

It is certified that error appears in the above-identified patent and that said Letters Patent is hereby corrected as shown below:

<u>Title page,</u>
Item [73], the Assignee should read:
-- Divicom --

Signed and Sealed this

Nineteenth Day of November, 2002

Attest:

JAMES E. ROGAN
*Attesting Officer*    *Director of the United States Patent and Trademark Office*